United States Patent [19]
Nishizawa et al.

[11] Patent Number: 5,122,881
[45] Date of Patent: Jun. 16, 1992

[54] SOLID-STATE IMAGING DEVICE WITH AN AMPLIFYING FET IN EACH PIXEL AND AN OUTPUT CAPACITOR IN EACH ROW

[75] Inventors: Shigeki Nishizawa; Iwao Takemoto, both of Mobara; Toshio Miyazawa, Chiba; Tetsuro Izawa, Mobara, all of Japan

[73] Assignee: Hitachi, Ltd., Tokyo, Japan

[21] Appl. No.: 389,549

[22] Filed: Aug. 4, 1989

[30] Foreign Application Priority Data

Aug. 10, 1988 [JP] Japan .................. 63-199491
Aug. 10, 1988 [JP] Japan .................. 63-199492

[51] Int. Cl.$^5$ .................. H04N 3/12; H04N 3/14; H04N 5/335
[52] U.S. Cl. .................. 358/212; 358/213.15; 358/213.27
[58] Field of Search .................. 358/213.29, 213.26, 358/213.17, 213.18, 213.11, 213.31, 213.15, 212; 341/31, 33; 382/1

[56] References Cited

U.S. PATENT DOCUMENTS

| | | | |
|---|---|---|---|
| 4,445,117 | 4/1984 | Gaalema et al. | 358/212 |
| 4,547,806 | 10/1985 | Herbst et al. | 358/212 |
| 4,566,040 | 1/1986 | Ozawa et al. | 358/213.29 |
| 4,831,451 | 5/1989 | Hynecek | 358/213.31 |
| 4,831,454 | 5/1989 | Tanaka et al. | 358/213.31 |
| 4,942,474 | 7/1990 | Akimoto et al. | 358/213.11 |
| 4,945,418 | 7/1990 | Mutoh | 358/213.31 |
| 4,945,419 | 7/1990 | Arques | 358/213.31 |
| 5,016,108 | 5/1991 | Akimoto et al. | 358/213.15 |

Primary Examiner—David K. Moore
Assistant Examiner—Wendy R. Greening
Attorney, Agent, or Firm—Antonelli, Terry, Stout & Kraus

[57] ABSTRACT

Disclosed is an MOS solid-state imaging device including a source-follower FRT amplifier in each picture-cell and a capacitor in each row for differentially directing output signals to cancel offset parameters such as those due to deviations of manufacturing caused during the process.

2 Claims, 10 Drawing Sheets

SOLID-STATE IMAGING DEVICE WITH AN AMPLIFYING FET IN EACH PIXEL AND AN OUTPUT CAPACITOR IN EACH ROW

FIELD OF THE INVENTION

The present invention relates to a solid-state imaging device and more particularly to the technique effectively utilizing an amplifying element which amplifies a photoelectric conversion signal of a photodiode and a switch element which selects the amplifying element and conducts precharging operation into a pixel amplifying solid-state imaging device using a MOSFET (e.g., insulated gate type field effect transistor).

DESCRIPTION OF THE PRIOR ART

As reported, for example, in the Proceedings of National Convention of Television Engineerings, 1986, PP. 51-52, a solid-state imaging device, in which the photoelectric conversion signal formed by a photodiode is directly read to external circuits with a source follower amplifier, has been proposed to satisfy the requirement of high sensitivity and high SN ratio.

In the pixel cell having such constitution, a MOSFET precharging a photodiode is different from a MOSFET to which is used for reading the signal of the photodiode. The element characteristics such as conductance and threshold voltage of MOSFETs formed in a semiconductor integrated circuit have comparatively large fluctuations due to various differences which occur in the manufacturing process. Therefore, the signal read out from each pixel is subject to the influence of these fluctuations in such element characteristics resulting in a disadvantage that such influence appears on an image signal as a deterioration of the image quality.

SUMMARY OF THE INVENTION

It is therefore an object of the present invention to provide a solid-state imaging device which generates an image signal having high sensitivity and high quality without being adversely influenced by processing fluctuations.

An outline of typical example of the present invention will be explained hereunder.

Namely, at a first timing point, a predetermined voltage is applied across a first capacitor, while at a second timing point, a voltage substantially corresponding to photoelectric conversion signal from the selected pixel is applied to the one electrode of the first capacitor. An output signal is thus obtained from the second capacitor by directly connecting the second capacitor to the other electrode side.

According to the means described above, since the photoelectric conversion signal is extracted through the capacitor, the pixel signal output depending on the capacitance ratio of the capacitance value of photodiode and the second capacitor for the read operation is amplified, the second capacitor can be separated from the path in which smear is easily be accummulated, and adverse effects on the pixel signal due to fluctuation in element characteristics of selected path can be prevented.

An outline of other embodiments disclosed in this specification will then be briefly explained hereunder.

Namely, a predetermined voltage is applied across the capacitor at a first timing point, while a voltage substantially corresponding to the photoelectric conversion signal from the selected pixel cell is applied to the one electrode of the capacitor at a second timing point and an output signal is obtained from the other electrode under the floating condition.

According to the means described above, since the photoelectric conversion signal is extracted through the capacitor, the pixel signal output depending on the capacitance ratio of the capacitance value of the photodiode and the capacitor for the read operation is amplified, and adverse effects on the image due to fluctuation of characteristics of element in the selected path can be prevented. The objects described above, as well as other objects and the novel features will become apparent from the description of the specification which follows and the accompanying drawings.

DETAILED DESCRIPTION OF THE PREFERRED EMBODIMENTS

Embodiment 1

Figure 1:
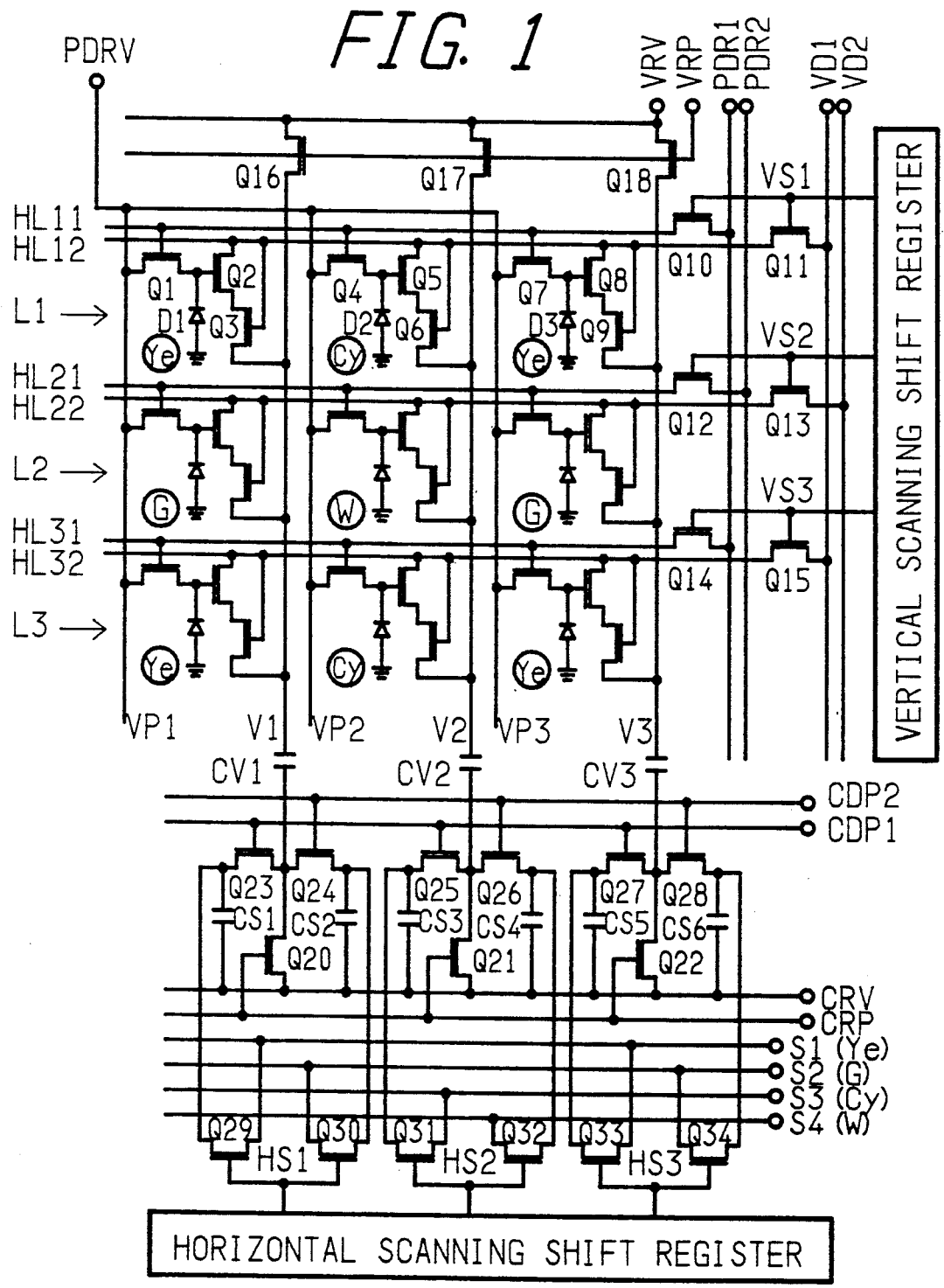
FIG. 1 is a circuit diagram of an important part of the invention indicating an embodiment of a solid-state color imaging device with an amplifying FET in each pixel and an output capacitor in each row.

FIG. 1 is a circuit diagram of an essential part of an embodiment of a solid-state color imaging device with an amplifying FET in each pixel and an output capacitor in each row of the present invention. In the same figure, a typical example includes pixel arrays of 3 rows and 3 columns, selection circuits thereof and signal read circuits. Each circuit element forming such a solid-state imaging element is formed on a single semiconductor substrate such as a single crystal silicon, although not particularly limited, by the well known semiconductor integrated circuit fabrication technique.

The solid-state imaging element is formed by the following circuits. A picture cell (pixel) is formed by a photodiode D1 of which an anode electrode is coupled with the ground potential of the circuit, an amplifying MOSFET Q2 of which a gate electrode is coupled with the cathode electrode of photodiode D1, a switch MOSFET Q1 which supplies a precharge (reset) voltage to the cathode electrode of photodiode D1, and a switch MOSFET Q3 for selection provided in the source side of such amplifying MOSFET Q2.

The drain of amplifying MOSFET Q2 and the gate of switch MOSFET Q3 are coupled with the second row selection line (vertical scanning line) HL12 arranged extending in the horizontal direction. The drains of amplifying MOSFETs Q5, Q6 and the gates of switch MOSFETs Q6, Q9 of the other pixel arranged in the same row are also coupled with the second row selction line HL12. The gate of switch MOSFET Q1 for precharge is coupled with the first selection line (vertical scanning line) HL11 arranged extending in the horizontal direction. In the same way, the switch MOSFETs Q4, Q7 for precharge of the other pixel arranged in the same row are also coupled with the first row selection line HL11.

The source of switch MOSFET Q3 for the read operation is coupled with the column signal line (vertical signal line) V1 arranged extending in the vertical direction. The source of switch MOSFET of the other pixel arranged in the same column is also coupled with the column signal line V1. This means that the sources of switch MOSFETs Q6, Q9 for the read operation are also coupled with similar column signal lines V2, V3 also in the pixels of the other columns.

Although not particularly limited, the drain side of MOSFET Q1 for precharge is coupled with the precharge line VP1 extended in the vertical direction. The drain of the similar MOSFET of the other pixel arranged in the same column is also coupled with the precharge line VP1. This means that the the drains of switch MOSFETs Q4, Q7 for precharge are also coupled with similar precharge lines VP2, Vp3 in the pixels of the other columns. The precharge lines VP1-VP3 explained above are coupled in common with the terminal PDRV at the upper end thereof through the wiring extended in the horizontal direction. From this terminal PDRV, a voltage for resetting (precharging) the photodiode D1, etc. is supplied.

The switch MOSFETs Q16-Q18 for reset are respectively provided between the column signal lines V1-V3 and the terminal VRV. The reset voltage is supplied to the terminal VRV. The gates of these switch MOSFETs Q16 Q18 for reset are connected in common and coupled with the terminal VRP. To this terminal VRP, the reset signal for resetting capacitors CV1-CV3 for read operation is supplied.

For the color imaging, yellow Ye color filter is formed to the pixel of the first row and first column among those of this embodiment, while a cyan Cy color filter is formed to the pixel of the first row and second column, a green G color filter to the pixel of the second row and first column and a white (transparent) W filter to the pixel of the second row and second column. With the constitution described above used as the basic pattern, each color filter is formed by repetition of the similar pattern.

In this embodiment, for the independent read operation of each color pixel signal corresponding to the color filter described above, the first row selection lines HL11, HL31 of odd rows indicated as a typical example are coupled with the timing signal line extended in the vertical direction through the switch MOSFETs Q10, Q14. This timing signal line is coupled with the terminal PDR1. The reset timing signal for resetting the pixels of odd rows is supplied to the terminal PDR1. The first row selection line HL21 of the even rows indicated as the typical example is coupled with the timing signal line extended in the vertical direction through the switch MOSFET Q12. This timing signal line is coupled with the terminal PDR2. The reset timing signal for resetting the pixels of even rows is supplied to the terminal PRD2.

The second row selection lines HL12 and HL32 of the odd rows indicated as a typical example are coupled with the timing signal line extended in the vertical direction through the switch MOSFETs Q11, Q15. This timing signal line is coupled with the terminal VD1. To the terminal VD1, the timing signal for a read operation of pixels of the odd rows is supplied. The second row selection line HL22 of the even lines of the typical example is coupled with the timing signal line extended in the vertical direction through the switch MOSFET Q13. This timing signal line is coupled with the terminal VD2. To this terminal VD2, the timing signal for the read operation of the pixels of even rows is supplied.

The gates of the switch MOSFETs Q10, Q11, Q12, Q13, Q14, Q15 of the same row are connected in common, and the vertical selection signals VS1, VS2 and VS3 formed by the vertical shift register VSR are supplied thereto.

In FIG. 1, it is omitted to give the reference numbers or codes to each element forming the pixels arranged in the second row and third row to simplify the drawing.

In this embodiment, following a read circuit is added to extract the photoelectric conversion signal of the photodiode D1, etc. without being adversely influenced by process fluctuations of element characteristics in the source follower amplifying MOSFET Q2, switch MOSFET Q3 and precharge MOSFET Q1.

The signal lines V1-V3 are respectively coupled one electrode of capacitors CV1-CV3. The other electrodes of these capacitors CV1-CV3 are coupled, with the control line extended in the horizontal direction through the switch MOSFETs Q20-Q22. This control line is connected with the terminal CRV. To this terminal CRV, a voltage for resetting the capacitors CV1-CV3 and extracting read data of pixels to the capacitors CV1-CV3 is supplied. The gates of switch MOSFETs Q20-Q22 are connected in common and controlled by switching with the control signal supplied from the terminal CRP. To the terminal CRP, the timing signal for resetting the capacitors CV1-CV3 is supplied.

The other electrode of capacitor CV1 is connected, on the other hand, to one electrode of each of capacitors CS1, CS2 through the switch MOSFETs Q23, Q24. The other electrodes of capacitors CS1, CS2 are coupled with the control line connected to the terminal CRV. The one electrodes of capacitors CS1, CS2 are respectively coupled with the output signal line extended in the horizontal direction through the switch MOSFETs Q29 and Q30. The output signal line corresponding to switch MOSFET Q29 is coupled with the terminal S1, which outputs the yellow Ye color pixel signal. The output signal line corresponding to the switch MOSFET Q30 is coupled with the terminal S2, which outputs the green G color pixel signal. To the gates of switch MOSFETs Q29, Q30, the vertical selection signal HS1 formed by the horizontal shift register HSR is supplied.

The other electrode of capacitor CV2 is connected, on the other hand, to one electrode of each of capacitors CS3 and CS4 through the switch MOSFETs Q25, Q26. The other electrodes of capacitors CS3 and CS4 are coupled with the control line connected to the terminal CRV. The one electrodes of capacitors CS3 and CS4 are coupled with the output signal line extended in the horizontal direction through the switch MOSFETs Q31, Q32. The output signal line corresponding to the switch MOSFET Q31 is connected with the terminal S3, which outputs cyan Cy color pixel signal. The output signal line corresponding to the switch MOSFET Q32 is coupled with the terminal S4, which outputs the white W color pixel signal. To the gates of switch MOSFETs Q31 and Q32, the vertical selection signal HS2 formed by the horizontal shift register HSR is supplied.

The other electrode of the capacitor CV3 is provided with the switch MOSFET and capacitor consisting of the circuits like the capacitor CV1. This corresponds to the fact that the signal line V3 is connected to the yellow Ye and Green G pixels like the signal line V1. However, to the gates of output switch MOSFET Q33, Q34 corresponding to the capacitors CS5 and CS6 for output, the vertical selection signal HS3 formed by the horizontal shift register HSR is supplied.

An example of the read operation of a solid-state imaging element of FIG. 1 will be explained with reference to the equivalent circuit shown in FIG. 2 and the timing diagram shown in FIG. 3.

Figure 2:
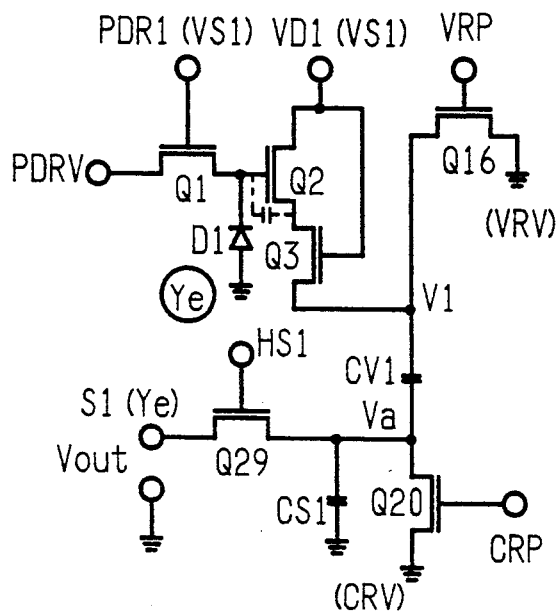
FIG. 2 is an equivalent circuit diagram for explaining a read operation in the structure of FIG. 1.
Figure 3:
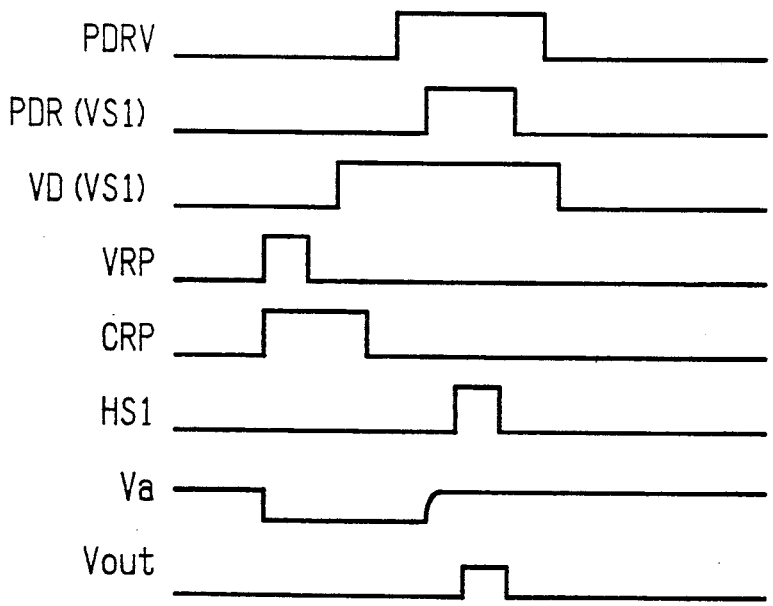
FIG. 3 is a timing diagram for explaining an example of the read operation thereof.

FIG. 2 shows an equivalent circuit of the read circuit focused on the pixel consisting of the photodiode D1, and MOSFETs Q1 to Q3. In this equivalent circuit, a ground potential of the circuit is applied to the terminals VRV and CRV.

Before reading of the pixel, the timing signals CRP and VRP are set to a high level and the switch MOSFETs Q20 and Q16 are turned ON. Therefore, these are reset when the ground potential of the circuit is applied across the capacitor CV1. This is also true for the other all capacitors CV2, CV3, etc. not illustrated.

After the timing signal VRp is set to a low level and the switch MOSFET Q16 is turned OFF, the timing signal VD1 is set to a high level. At this time, the vertical shift register VSR sets the vertical selection signal VS1 of the first row to a high level. In synchronization with the timing signal VD1 being set to a high level, an operation voltage is given to the drain of amplifying MOSFET Q2, and the switch MOSFET Q3 for the read operation is turned ON. Therefore, the photoelectric conversion voltage accummulated in the photodiode D1 is sent to the capacitor CV1 through the gate and source of the source follower amplifying MOSFET Q2 and the switch MOSFET Q3. The photoelectric conversion voltage of the corresponding pixel is also sent to the other capacitors CV2, CV3.

The photoelectric conversion voltage sent to the capacitor CV1 is equal to the remaining voltage after the precharge voltage by the precharge operation conducted for the photodiode D1 is discharged due to a photocurrent generated in the photodiodes D1-D3. In this case, the precharge voltage fluctuates corresponding to fluctuation of conductance characteristics of MOSFET Q1 and fluctuation is also generated in the threshold voltage between the gate and source of the amplifying MOSFET Q2 for reading a voltage and conductance characteristic of switch MOSFET Q3. Therefore, the voltage sent to the capacitor CV1 includes influences of the process fluctuation of each element.

In this embodiment, a voltage fetched by the capacitor CV1 is not directly output but the timing signal supplied to the terminal CRp is set to a low level to turn OFF the switch MOSFET Q20. Thereby, the output side of capacitor CV1 is floated. Thereafter, the precharge voltage is supplied to the terminal PDRV and a high level timing signal is supplied to the terminal PDR1. Therefore, since the vertical selection signal VS1 is high level, the switch MOSFET Q1 turns ON and the precharge voltage is supplied to the photodiode D1.

Accordingly, the signal line side V1 of capacitor CV1 is set to a voltage depending on the precharge voltage and thereby the output side of capacitor CV1 is also shifted in level. In other words, only the photoelectric conversion voltage formed by the photodiode D1 appears in the output side electrode of the capacitor CV1, because the process fluctuation of precharge MOSFET Q1 is cancelled to zero since the precharge voltage is considered as the reference voltage. Moreover, since an output signal is formed with the precharge voltage considered as the reference voltage, in place of the ground potential of the circuit, the process fluctuation of the amplifying MOSFET Q2 and switch MOSFET Q3 is cancelled. Such photoelectric conversion voltage is fetched by the capacitor CS1 connected in series with the capacitor CV1.

Accordingly, when the switch MOSFET Q29 is turned ON with the horizontal scanning signal HS1, only the photoelectric conversion voltage formed by the photodiode D1 held in the capacitor CS1 appears at the terminal S1 through the switch MOSFET Q29.

The capacitor CV1 is coupled with the source side of switch MOSFET Q3. The source of MOSFET easily allows appearance of a false signal such as smear due to formation of a parasitic photodiode. In this embodiment, influence of such a false signal can be eliminated by turning OFF the switch MOSFET Q23 selectively connecting the capacitor CS1 for the read operation after fetching the signal charges.

In the equivalent circuit of FIG. 2, the switch MOSFET Q23 to be provided between the capacitor CS1 and capacitor CV1 is eliminated for explaining the read operation of the one pixel. Since the read operation of the photoelectric conversion voltage is carried out in parallel to the other capacitors CV2, CV3 not illustrated, the signal voltages held in the capacitors connected in series are output serially in synchronization with the horizontal scanning signals HS2, HS3.

The timing signal, although not illustrated, read from the pixel to the capacitor is generated in the horizontal blanking period.

Figure 4:
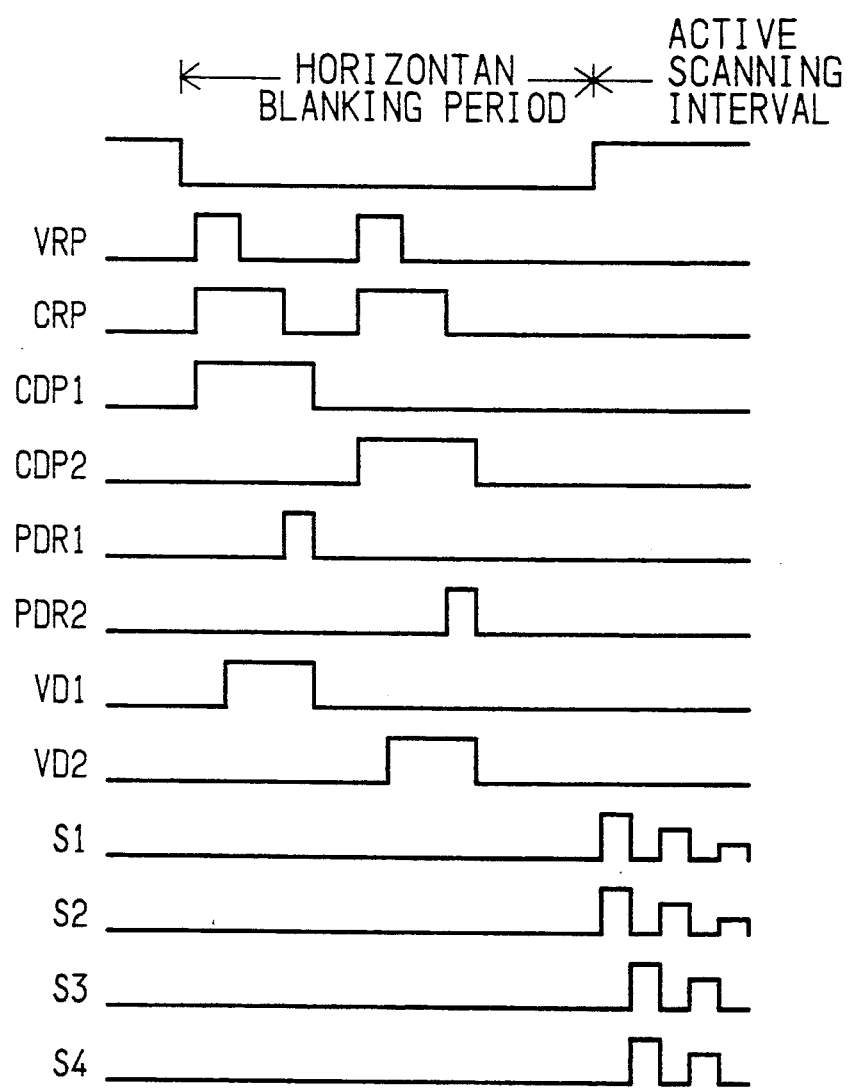
FIG. 4 is a timing diagram for explaining an example of the read operation for a color image signal.

FIG. 4 is a timing diagram indicating an example of the independent read operation of the color pixel in the embodiment circuit shown in FIG. 1.

Since four color sub-pixels form a pixel, the vertical shift register VSR simultaneously selects two rows L1 and L2. Moreover, an interlace gate circuit is provided at the output of vertical shift register VSR, and thereby the first and second lines L1 and L2 are selected simultaneously in the odd fields and the second row L2 and the third row L3 may be selected simultaneously in the even fields. As described, the rows are selected in units of pairs with the one row deviated in the odd and even fields. Thus an image signal in which spacial gravity is shifted vertically be obtained corresponding to the interlace.

Accordingly, the signal of the pixels of first row L1 is held in the capacitors CS1, CS3, CS5 by generating the timing signals CDP1, VD1 and PDR1 in the similar sequence in the former half of the horizontal blanking period. Thereafter, the timing signals VRP, CRP are once set to the low level and then set to the high level to conduct a precharge operation in order to generate the timing signals CDP2, VD2 and PDR2 in the similar sequence. Thereby, the signal of second row L2 is held in the capacitors CS2, CS4 and CS6.

In the image period upon completion of the horizontal blanking period, the horizontal scanning signals HS1 HS3 are formed on the time series basis corresponding to the shift operation of horizontal shift register HSR. Accordingly, in synchronization with the horizontal scanning signal HS1, the yellow Ye and green G signals held in the capacitors CS1 and CS2 are output from the terminals S1 and S2, and in synchronization with the horizontal scanning signal HS2, the cyan Cy and white W signals held in the capacitors CS3 and CS4 are output from the terminals S3 and S4. Hereinafter, the color pixel signals are independently output in a similar sequence in synchronization with the horizontal scanning operation.

Embodiment 2

Figure 5:
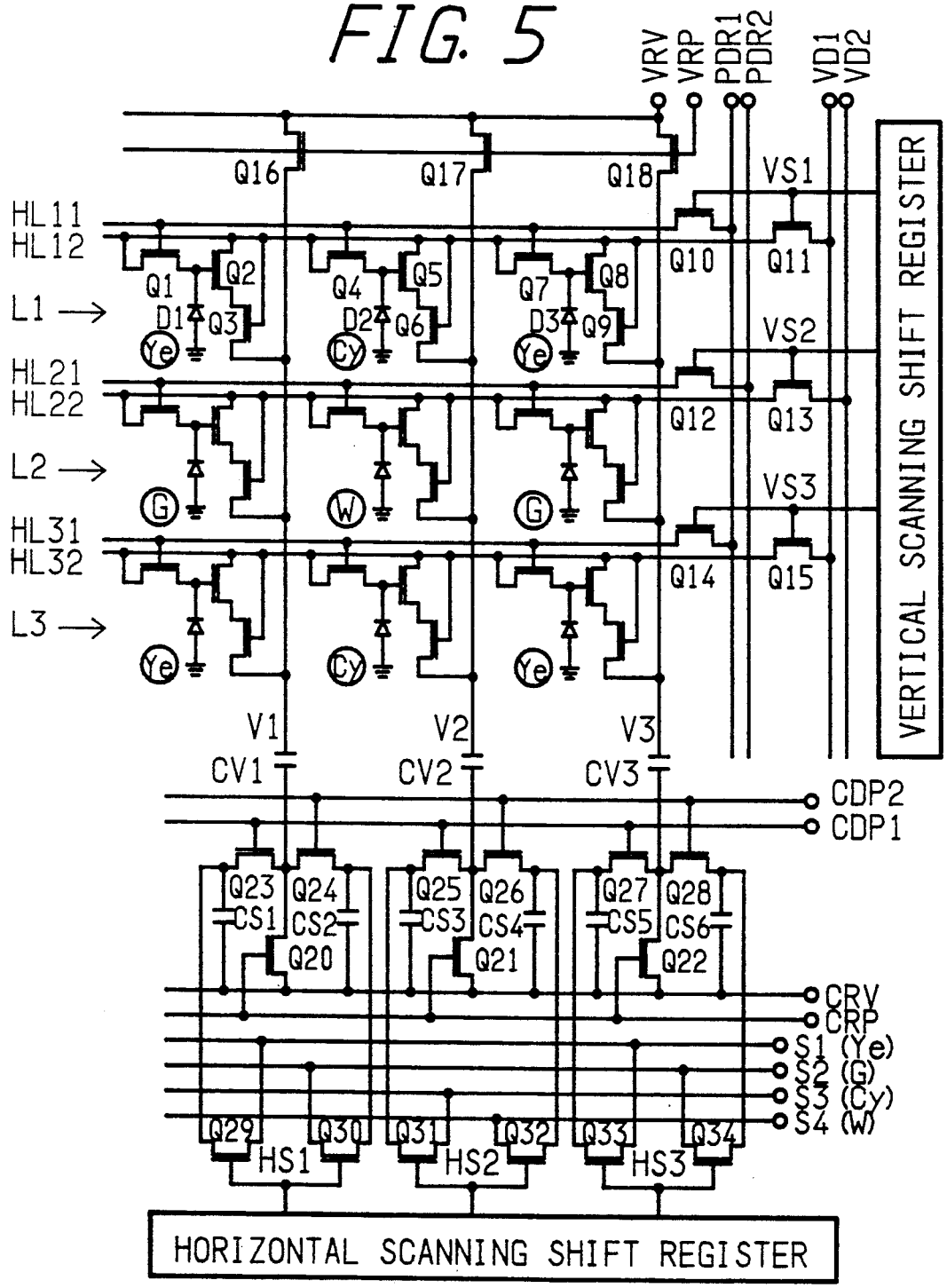
FIG. 5 is a circuit diagram of an essential part indicating another embodiment of a solid-state color imaging device with an amplifying FET in each pixel and an output capacitor in each row of the present invention.

FIG. 5 is a circuit diagram of an essential part of another embodiment of a solid-state color imaging device with an amplifying FET in each pixel and an output capacitor in each row of the present invention.

In this embodiment, the selection voltage of the second row selection line HL12 is used as the precharge voltage for the photodiode. Namely, concerning the first row L1, the drains of precharge MOSFETs Q1, Q4 and Q7 are coupled with the second row selection line HL12. In the case of this constitution, the precharge line VP1 extends in the vertical direction in the pixel array of the embodiment shown in FIG. 1, the wirings extends in the horizontal direction to shortcircuit these precharge lines, and the terminal PDRV for supplying the precharge voltage can be omitted. Thereby, the circuits can be simplified. In this embodiment, the precharge voltage is read simultaneously with the read operation of pixels but the precharge operation is not influenced because it is carried out with the timing signals PDR1, PDR2.

Embodiment 3

Figure 6:
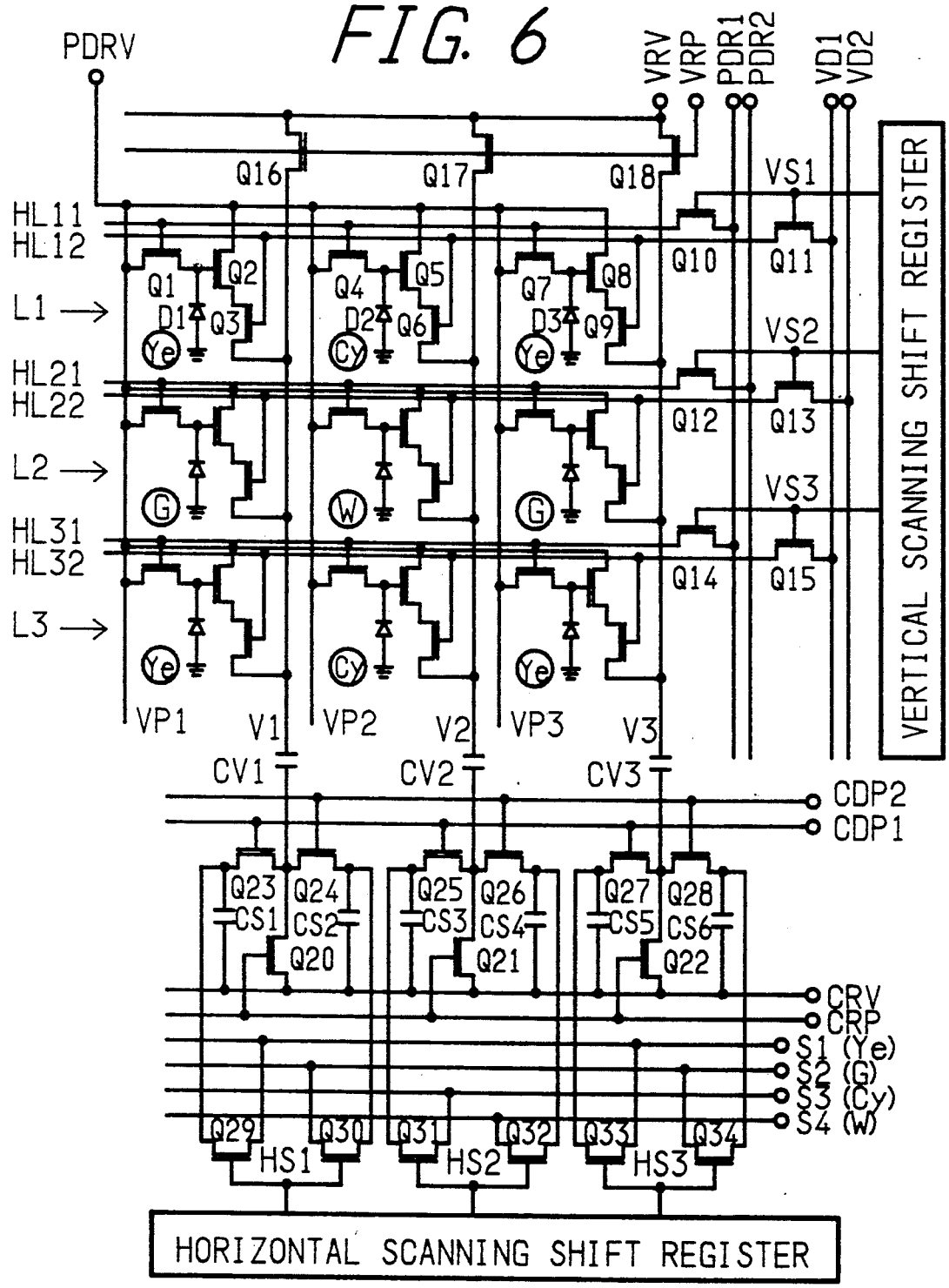
FIG. 6 is a circuit diagram indicating still another embodiment of a solid-state color imaging device with an amplifying FET in each pixel and an output capacitor in each row of the present invention.

FIG. 6 is a circuit diagram of an essential part of another embodiment of a solid-state color imaging device with an amplifying FET in each pixel and an output capacitor in each row of the present invention. In this embodiment, the precharge voltage for the photodiode and drain voltage of amplifying MOSFET Q2 are supplied in common from the terminal PDRV. The other constitution is similar to the embodiment shown in FIG. 1, and explanation thereof is omitted here.

Embodiment 4

Figure 7:
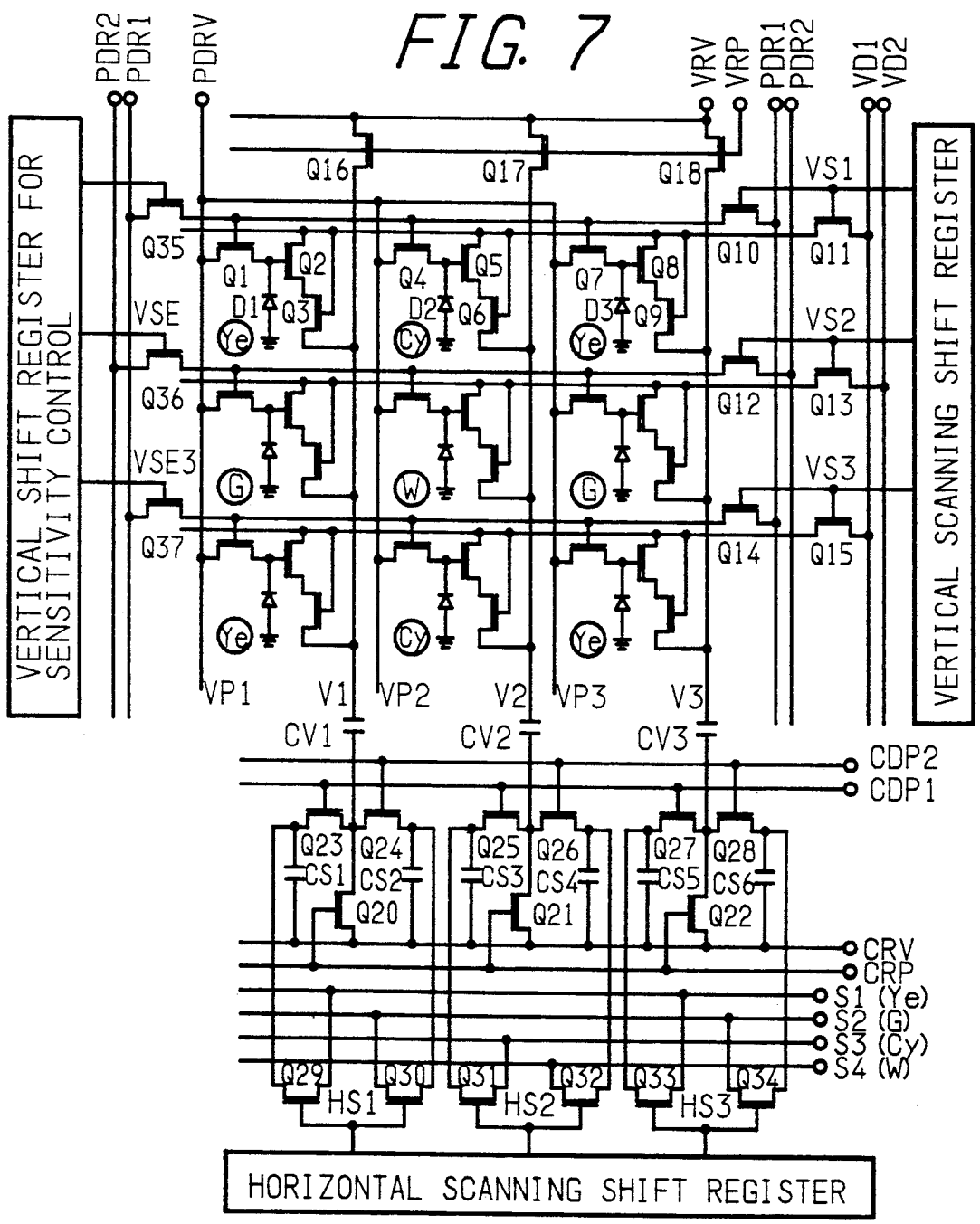
FIG. 7 is a circuit diagram indicating another embodiment of a solid-state color imaging device with an amplifying FET in each pixel and an output capacitor in each row of the present invention.

FIG. 7 is a circuit diagram of an essential part of another embodiment of a solid-state color imaging device with an amplifying FET in each pixel and an output capacitor in each row of the present invention.

In this embodiment, the vertical shift register VSRE for sensitivity control is provided in order to add the sensitivity adjusting function. An output signal of this vertical shift register VSRE is sent to the first row selection line for controlling the precharge operation of each row through the similar switch MOSFETs Q35 to Q37. The timing signals PDR1 and PDR2 are common with the signal for read operation. When the interlace gate circuit is provided for the vertical shift register for the read operation as explained above, a similar interlace gate circuit is also provided to the vertical shift register VSRE. The circuits for sensitivity control are arranged in the left side, although not particularly limited, for the pixel array. This vertical shift register VSRE is formed by the circuit similar to the vertical shift register VSR for the read operation. In this case, the same clock signal is supplied, although not illustrated, for the shift operations, in the synchronized timing, of the vertical shift register VSR for the read operation and the vertical shift register VSRE for sensitivity adjustment.

Next, the sensitivity control operation by a solid-state imaging device of this embodiment will be explained hereunder.

The vertical scanning operation in the interlace mode is considered as an example for simplifying explanation. For instance, the selecting operation of the third row L3 is carried out by the vertical shift register VSR for sensitivity control in parallel to the read operation of the first row L1 by the vertical shift register VSR for the read operation. Thereby, the pixels of the third row L3 are reset (precharged) in parallel to the read operation from the first row L1 in the horizontal blanking period.

Accordingly, since the read operation of the third row L3 by the vertical shift register VSR for the read operation is carried out through the vertical scanning operation after the read operations of the first and second rows, the accummulation time of photodiodes of pixels arranged in the third row becomes equal to the read time of pixels for two rows.

Otherwise, the selecting operation of second row L2 is carried out by the vertical shift register VSR for sensitivity control in parallel to the read operation of the first row L1 by the vertical shift register VSR for the read operation. Thereby, the pixels of second row L2 are reset (precharged) in parallel to the read operation of the first row L1 in the horizontal blanking period.

Therefore, since the read operation of the second row L2 by the vertical shift register VSR for the read operation is carried out through the vertical scanning operation after the read operation of the first row, the accummulation time of photodiodes of the pixels arranged in the second row becomes equal to the read time of the pixels of one row, which is a half the and thereby the sensitivity can also be lowered to a half.

As described above, since the pixels of the row are reset by the prior vertical scanning operation to be conducted by the scanning circuit such as the vertical shift register VSRE for sensitivity control, the time until the actual read operation is carried out by the scanning circuit for a read operation after the reset operation is considered as the accummulating time for the photodiode. Accordingly, in the noninterlace mode, the accummulating time in multisteps of 525 steps in maximum can be set. In other words, the sensitivity can be set as many as 525 steps in units of the time for reading one row, in the pixel array of 525 rows by the different address designation by both vertical scanning circuits and selecting operations of pixels by the common horizontal scanning circuit. However, it is supposed that changes in brightness at the light receiving area can be neglected for the scanning time forming the one display screen and the constant light beam is substantially incident to the photodiode. The maximum sensitivity (525) can be obtained when the scanning circuit for sensitivity control is non-operated.

The effects of the embodiment explained above are as follow.

(1) The read data of the pixel comprising the source follower amplifying element which receives the voltage photoelectrically converted by the photodiode, the switching element for the read operation provided in the source side of such amplifying element, and the switching element for precharge, which precharges the photodiode, is sent to the first capacitor at a first timing point and the pixel signal is obtained from the second capacitor by precharging such pixel at a second timing point, and by directly connecting the second capacitor reset previously to the first capacitor. In such a constitution, since the photoelectrical conversion signal is extracted with reference to the precharge voltage, any deterioration of image quality due to fluctuation of element characteristics of precharge MOSFET and amplifying MOSFET is not generated in the read signal, and both high sensitivity and high image qualty can be realized.

(2) Two signals can be extracted on the time sharing basis from the same signal line by connecting in series the second capacitor to hold the image signal. Thereby the color image signal can be output from the independent terminal.

(3) It is possible to avoid influence of a false signal such as smear generated in the source side of the switch MOSFET Q3 connected to the capacitor CV1 by connecting in series the second capacitor to hold the image signal.

(4) Since the pixel signals from the pixels of one row are transferred to the capacitor for the read operation simultaneously in parallel to the horizontal blanking period, a load of the horizontal selection circuit becomes light since it is reduced to that of only one switch MOSFET, and thereby the horizontal shift register can be simplified and a mixture of switch noise due to the operation of horizontal shift register can be minimized.

Embodiment 5

Figure 8:
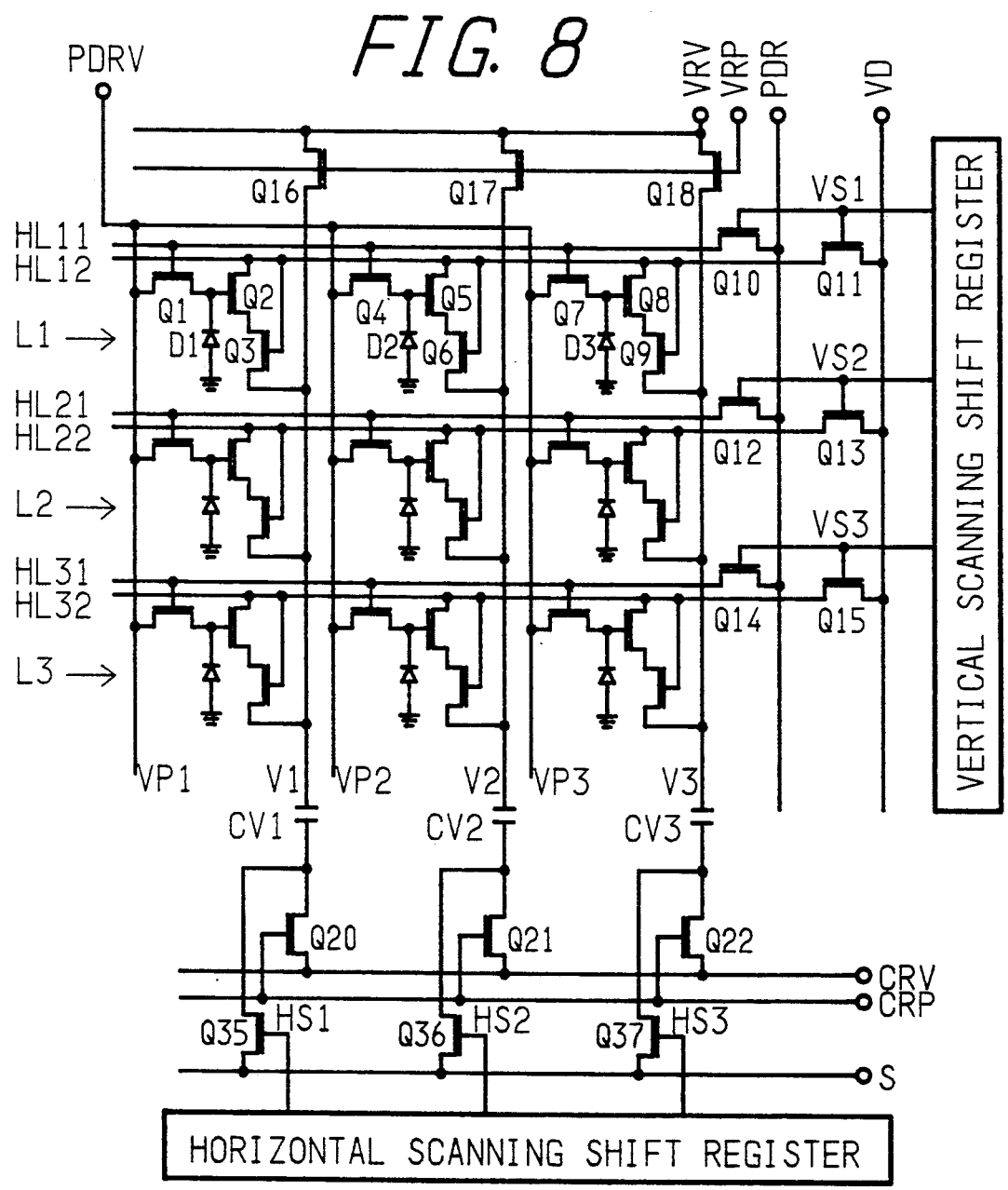
FIG. 8 is a circuit diagram of essential part indicating another embodiment of a solid-state color imaging device with an amplifying FET in each pixel and an output capacitor in each row of the present invention.
Figure 9:
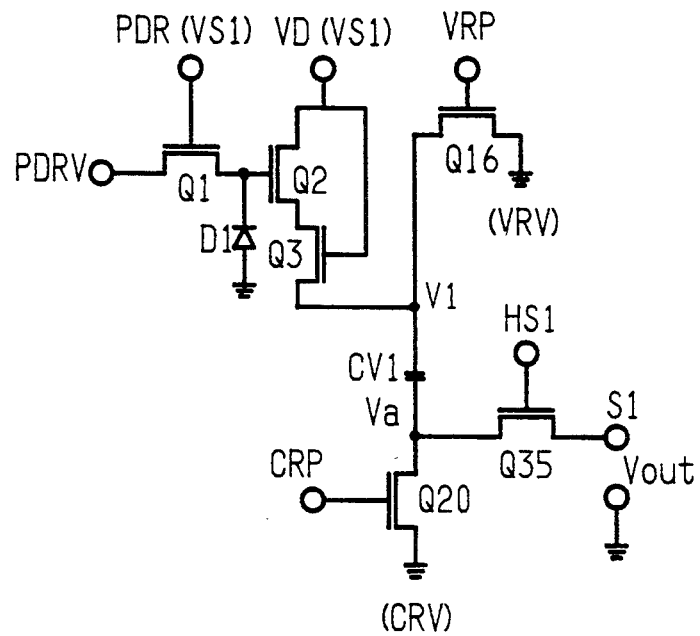
FIG. 9, 10 and 11 are is an equivalent circuit diagrams for explaining read operations in accordance with the invention.
Figure 10:
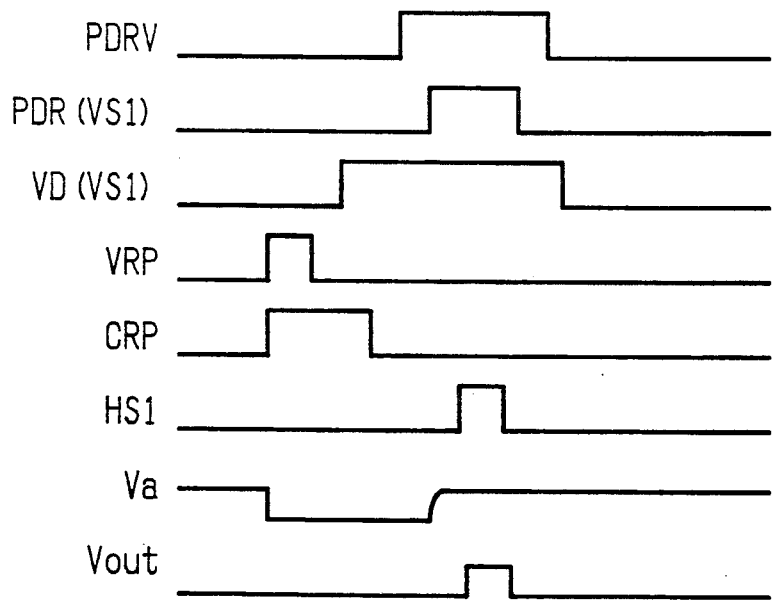
Figure 11:
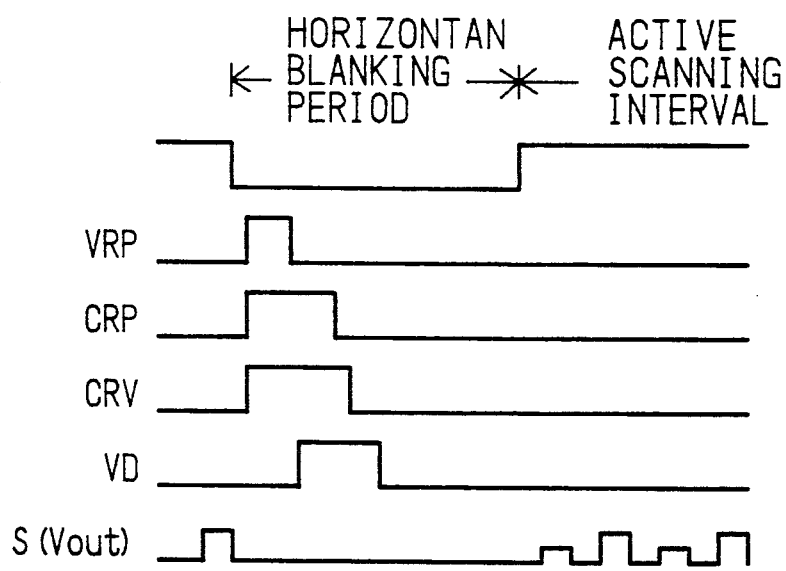

FIG. 8 is an embodiment where the present invention is applied to a monochrome imaging device, and the elements corresponding to those of a color imaging device shown in FIG. 1 are designated by the same reference numerals. FIG. 9, FIG. 10 and FIG. 11 show the circuit diagram of an essential part and operation waveforms of such monochrome imaging device corresponding to those of color imaging device shown in FIG. 2, FIG. 3 and FIG. 4.

The circuit constitution and basic operation are almost similar to that of color imaging device described above, and explanation about operations is also omitted here, except to note the difference that the timing signals CDP1, CDp2 for color separation of the same row, FETs Q23 Q28 and capacitors CS1 CS6 are omitted and the signal outputs is reduced to one from four signals, and the FETs driven with each output of horizontal shift registers is reduced to one from two devices.

Figure 12:
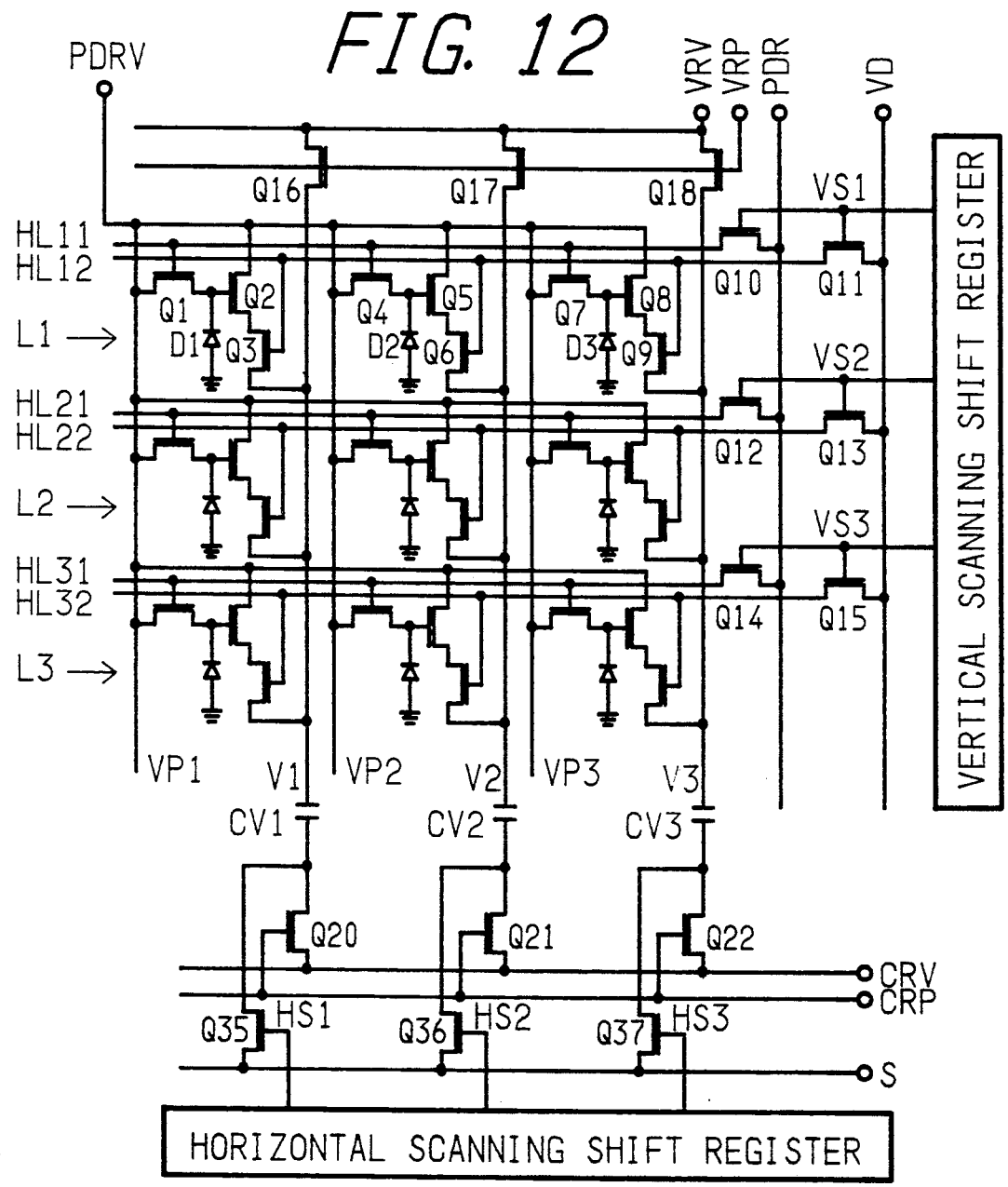
FIG. 12 is a circuit diagram of an important part of another embodiment of a solid-state color imaging device with an amplifying FET in each pixel and an output capacitor in each row of the present invention.

FIG. 12 is an embodiment of the monochrome imaging device replaced from a color imaging device of FIG. 6, and explanation about operations is omitted here.

While the present invention has been described with respect to specific embodiments thereof, it is to be understood that the present invention is not limited thereto in any way but covers any and all changes and modifications which will become possible within the scope of the claims. For example, in the embodiment circuit of FIG. 1, it is possible that the terminals VRV and CRV are connected in common in order to reduce the number of external terminals. As described, the circuit can be simplified through common constitution of timing signals and terminals. Moreover, it may also be possible for MOSFET to use JFET and BJT. Namely, any type of amplifying transistor and switch element having high input impedance may be used.

As the reading system, it is also permitted that a voltage is set to the potential, at a first timing point, corresponding to the one electrode of the photodiode and the first capacitor for the read operation, the one electrode of the capacitor is connected to the pixels at a second timing point, and is connected in series with the second capacitor to extract the pixel signals from the second capacitor.

As the pixel, those used for the conventional MOS solid-state imaging device forming the precharge path and read path with a series connected switch MOSFET and photodiode may be used in addition to the pixel amplifying type providing an amplifying element to each pixel, as in the case of the embodiments described above. It is also allowed to provide a capacitor circuit as described to the read output section. In such a constitution, since the signal voltage of pixels is extracted through a capacitor having a comparatively large capacitance value, the amplifying effect corresponding to the capacitance ratio between the junction capacitance of the photodiode and the capacitance of second capacitor for read operation can be realized without providing the amplifying element to individual pixel.

What is claimed is:

1. A solid-state imaging device comprising:
    a signal line;
    a plurality of picture cells each including a photoelectric converting element, a source follower transistor with, at a gate node thereof, a storage capacitance for storing a converted signal from the photoelectric converting element, a reset transistor for resetting said storage capacitance at said gate node of said source follower transistor, and a switching transistor for accessing said picture cell, wherein each of said picture cells provides, at said signal line, a signal voltage which will follow the voltage at said gate node of said source follower transistor in response to a scanning signal;
    a detecting capacitor with a first terminal coupled to said signal line and a second terminal; and
    a differential circuit including said detecting capacitor operating such that, in a first mode, said second terminal is driven to have a reference potential with low impedance so as to charge said detecting capacitor at a voltage responsive to said signal voltage, and, in a second mode, said second terminal is opened with high impedance, whereby deriving in said second mode at said second terminal a detecting voltage responsive to the difference between said signal voltages in said second mode and said first mode.

2. A solid-state imaging device comprising:

a signal line;
a plurality of picture cells each including a photodiode, a first transistor with a gate electrically coupled to said photodiode, a second transistor for conditionally resetting a gate node of said first transistor to a predetermined potential, and a third transistor with a gate electrically coupled to a scanning signal, wherein current paths between sources and drains of said first and third transistors are coupled in series, and wherein the series coupled current paths are coupled to said signal line;
a capacitor with a first terminal, coupled to said signal line, and a second terminal; and
a switching transistor with a gate to which a pulse signal is applied, wherein a source of said switching transistor is electrically coupled to a reference potential source, and a drain of said switching transistor is electrically coupled with said second terminal.

* * * * *